Patented Oct. 5, 1943

2,330,827

UNITED STATES PATENT OFFICE 2,330,827

NAPHTHALENE-FORMALDEHYDE-PHENOL RESIN

Ernest B. Kester, Forest Hills, Pa., assignor to Koppers Company, Pittsburgh, Pa., a corporation of Delaware No Drawing. Application April 27, 1940, Serial No. 332,073

13 Claims. (Cl. 260—43)

This invention relates to plastic compositions and methods of preparing the same. More particularly the invention relates to resinous materials resulting from the reaction of a phenol on a naphthalene formaldehyde condensation product.

It has long been considered desirable to resinify naphthalene and obtain therefrom a plastic composition having a wide application more nearly comparable with that of other well known resins. Resins prepared by reacting naphthalene with formaldehyde are generally found to be incompatible with drying oils. Other properties as well as incompatibility of such resins render them not entirely satisfactory for certain uses. The field for their application is therefore somewhat limited.

An object of the present invention is to provide an improved naphthalene resin. A further object is to provide a process of preparing such a resin from a naphthalene aldehyde condensation product and a phenol.

The present invention includes the preparation of a resin by reacting a phenol with a naphthalene aldehyde condensation product. The resinified naphthalene aldehyde product is first formed preferably in the presence of an acid catalyst. The subsequent reaction of the phenol with the naphthalene formaldehyde product is preferably conducted also in the presence of the acid catalyst. In other words the reactions may be carried on successively in a common acid medium. Sulphuric acid or phosphoric acid ($H_3PO_4$) may be used as catalysts.

It is preferable to resinify the naphthalene before adding the phenol since the reaction of the aldehyde with phenol is so much faster that when the aldehyde is contacted with a mixture of phenol and naphthalene it is generally found that the naphthalene or a substantial part thereof remains unreacted.

The naphthalene may be in the form of the pure solid or the press cake which is obtained by filtering crystallized naphthalene from a fraction of coal tar obtained by distillation between approximately 180° and 250° C. It has been found satisfactory to use this naphthalene fraction as such, preferably free from phenol.

The formaldehyde employed in the condensation of naphthalene is preferably in the form of aqueous solutions, as for instance, commercial formalin containing from thirty-eight to forty-two per cent by volume of formaldehyde. Paraformaldehyde may also be used, preferably the anhydrous form, in which case zinc chloride may be used as the catalyst in place of acid.

Phenols are employed which are derived from the aromatic hydrocarbons by the replacement of hydrogen of the benzenoid residue by hydroxyl, or which are produced in the dry distillation of wood, coal, etc. and obtained from the middle oil from coal tar. Benzophenol ($C_6H_5OH$), ortho-, meta-, and paracresol, xylenols (the six isomers), alpha- and beta-naphthol, either individually or mixtures of two or more of these may be used. Orthocresol has given particularly favorable results. The phenols are preferably used in molten or solid form. If desired, just enough solvent may be added to liquefy the crystals of a phenol.

In the following examples, which are set forth by way of illustration, the sulphuric acid used is originally 66° Baumé acid (94–95%). This is brought to the desired dilution by the water in the formalin and the water of condensation or reaction, so that actually the catalyst is a dilute acid.

The proportions given in the examples are in parts by weight.

*Example 1.*—About 256 parts of naphthalene are added to a mixture of about 150 parts of formalin and about 120 parts of sulfuric acid. The mixture of formalin and acid is preferably cooled prior to the addition of the naphthalene. Heat is applied to the resulting mixture with stirring and when a temperature of about 103° C. is reached it is maintained between about 103° and about 115° for about 3.5 hours after which about 54 parts of orthocresol are introduced. The heating and stirring are continued for an additional period of about 5.5 hours after which the resin product is separated from the heated mass.

If desired, the above separation may be performed by adding to the said mass about 200 parts of toluene and a solution of 75 parts of sodium hydroxide in about 150 parts of water. An aqueous layer is permitted to form and is removed. The resin dissolves in the toluene. The toluene solution which forms is filtered through diatomaceous earth to clarify and promote additional separation or breaking of an emulsion. The resin solution is then steam distilled to remove the toluene. The yield in the above procedure is about 275 parts of resin.

This resin is soluble in acetone, trichloroethylene, butyl acetate, and in linseed oil. It is slightly soluble in petroleum hydrocarbons, alcohol, butyl alcohol, and turpentine. It contains about 1.9% hydroxyl oxygen.

*Example 2.*—About 256 parts of naphthalene are added to a cooled solution of about 120 parts of sulphuric acid in 150 parts of formalin. Heat is applied with stirring and when the temperature reaches 105° C. heating is continued for 3.5 hours while maintaining the temperature at about 105° to about 110° C. Then a mixture of about 47 parts of phenol and about 15 parts of water, or just enough to dissolve the phenol, is slowly added and the heating continued for about 4 hours more. The product is worked up as in Example 1. The yield is about 272 parts of resin, the properties of which are similar to those of the resin prepared in Example 1. The hydroxyl oxygen content is about 2.3%.

*Example 3.*—About 256 parts of naphthalene (2 moles) are added to a cooled solution of about 150 parts of sulfuric acid in about 187.5 parts of formalin (2.5 moles formaldehyde). Heat is applied and the temperature maintained at about 105° to 113° C. for about 3.5 hours. Then about 61 parts of redistilled xylenols (0.5 mole) are added. The xylenols may be those present in a coal tar fraction having a boiling range of about 204° to about 225° C. The reaction which takes place appears to be quite vigorous and the resulting mass tends to stiffen relatively rapidly so that after about 15 minutes it is necessary to add about 50 parts of toluene. The mixture then becomes quite fluid and the heating may be resumed for an additional two hours. The resin may be separated from the reactants in the manner set forth in Example 1. The yield is about 285 parts of resin. The hydroxyl oxygen content is about 2.7%. The resin is soluble in solvents mentioned above, including drying oils.

*Example 4.*—A mixture of about 256 parts of naphthalene (2 moles), about 150 parts of formalin (2 moles formaldehyde), and about 120 parts of sulfuric acid is stirred at about 105 to 110° C. for about 3.5 hours, after which about 94 parts of benzophenol (1 mole) are added and heating and stirring continued for about 14.5 hours. When the stirring and heating are discontinued, the mixture is permitted to separate into layers. The upper layer is dissolved in about 200 parts of toluene, washed to remove substantially all of the sulfuric acid, and steam-distilled to remove the toluene.

The hydroxyl oxygen content of this resin is about 3.17%. It has a softening point of about 81.5° C. and is compatible with drying oils, benzene, toluene, warm xylene, and warm butyl alcohol, and partially miscible with cold turpentine.

*Example 5.*—A resin is prepared as in Example 4 but about 141 parts of phenol are used and the total reaction time is about 7.83 hours. The hydroxyl oxygen content of this resin is about 4.54%. It is soluble in the solvents and drying oils mentioned above.

*Example 6.*—About 256 parts of naphthalene, about 150 parts of formalin and about 120 parts of sulfuric acid (66° Bé.) are reacted at about 105° to about 110° C. for about 3½ hours with stirring and under reflux. Then about 94 parts of benzophenol are added and the stirring and refluxing continued while heating at a temperature of about 110° C. for an additional period of about 14½ hours. The resulting resin is washed repeatedly with hot water until the sulphuric acid is completely eliminated or substantially so. The resin thus prepared has a softening point of about 81.5° C. and a hydroxyl oxygen content of about 3.17%. It is compatible with drying oils such as linseed oil, China-wood oil, oiticica.

It is noted that the resin prepared as disclosed above may be plasticized with non-drying oils, drying oils, and waxes of animal or vegetable origin, including oils specifically mentioned herein.

What is claimed is:

1. A composition of matter comprising the resin product obtained by heating and reacting a phenol with a naphthalene formaldehyde condensation product, the said composition being soluble in vegetable drying oil.

2. A composition of matter comprising the resin product obtained by heating and reacting a phenol with a naphthalene formaldehyde condensation product, the said composition being a fusible resin soluble in vegetable drying oil.

3. A composition of matter comprising the resin product obtained by heating and reacting benzophenol with a naphthalene formaldehyde condensation product, the said composition being soluble in vegetable drying oil.

4. A composition of matter comprising the resin product obtained by heating and reacting orthocresol with a naphthalene formaldehyde condensation product, the said composition being soluble in vegetable drying oil.

5. A composition of matter comprising the resin product obtained by heating and reacting a xylenol with a naphthalene formaldehyde condensation product, the said composition being soluble in vegetable drying oil.

6. A process of preparing resinous products which process comprises heating together a phenol and a naphthalene formaldehyde condensation product to react the phenol with the said condensation product to form a resin.

7. A process of preparing resinous products which process comprises heating together benzophenol and a naphthalene formaldehyde condensation product to react the benzophenol with the said condensation product to form a resin.

8. A process of preparing resinous products which process comprises heating together orthocresol and a naphthalene formaldehyde condensation product to react the orthocresol with the said condensation product to form a resin.

9. A process of preparing resinous products which process comprises heating together a xylenol and a naphthalene formaldehyde condensation product to react the xylenol with the said condensation product to form a resin.

10. A process of preparing resinous products which process comprises reacting successively in a common acid medium naphthalene and formaldehyde to resinify the naphthalene, and then the resulting resinified product with a phenol to form a resin, the said acid medium catalyzing the successive reactions.

11. A process of preparing resinous products which process comprises reacting successively in a common acid medium naphthalene and formaldehyde to resinify the naphthalene, and then the resulting resinified product with a phenol to form a resin, and removing the resulting resin from the resulting mass.

12. A process of preparing resinous products which process comprises reacting successively in a common acid medium naphthalene, free from phenol, and formaldehyde to resinify the naphthalene, and then the resulting resinified product with a phenol to form a resin, and removing the resulting resin from the resulting mass.

13. In a process of preparing plastic compositions, the step comprising subjecting a naphthalene formaldehyde condensation product to the action of a phenol to form a resin.

ERNEST B. KESTER.